3,458,528
NITROIMIDAZOLE CARBONATES AND THIONOCARBONATES
George Gal, Summit, N.J., assignor to Merck & Co., Inc., Rahway, N.J., a corporation of New Jersey
No Drawing. Continuation-in-part of application Ser. No. 470,190, July 7, 1965. This application May 18, 1966, Ser. No. 550,925
Int. Cl. C07d *49/36;* C07c *154/00;* A01n *9/20*
U.S. Cl. 260—309                              2 Claims

ABSTRACT OF THE DISCLOSURE 1-substituted-5-nitroimidazol-2-ylalkyl phenyl carbonates, phenyl thionocarbonates, carbamates, and thionocarbamates. The carbamates are prepared by reacting the corresponding phenyl carbonates with an amine. The carbonates are prepared by reacting the corresponding 2-hydroxyalkyl or 2-mercaptoalkyl imidazoles with phenoxycarbonyl chloride or phenoxythiocarbonyl chloride. The carbamates are useful as anti-parasitic agents.

---

This application is a continuation-in-part of my co-pending application Ser. No. 470,190 filed July 7, 1965, now abandoned.

This invention relates to novel chemical processes. More particularly, it relates to a novel method for preparing imidazolylalkyl carbamates from hydroxyalkyl imidazoles. In addition, it is concerned with novel chemical compounds which are intermediates in said process.

1-substituted-5-nitroimidazol-2-ylalkyl carbamates have a high degree of antiparasitic activity and are useful in the treatment of parasitic diseases, for example, trichomoniasis, enterohepatitis and schistosomiasis. Certain of them are also effective against amoebiasis and trypanosomiasis as well as the PPLO organisms. Certain of the compositions of the present invention also show antibacterial activity. Several methods have been developed for synthesizing such carbamates but not all of them are completely satisfactory and research continues with the purpose of developing improved syntheses. It is one object of the present invention to provide a new and highly satisfactory synthesis of 1-substituted-5-nitroimidazol-2-yl-alkyl, N-substituted and N,N-disubstituted carbamates. A further object is to provide a synthesis which utilizes readily accessible starting materials. An additional object is to provide a process which affords the desired carbamates in high yield. Additional objects will become evident from the following description of the invention.

According to the present invention, it has now been found that 1-substituted-imidazol-2-ylalkyl carbamates may be readily prepared from 1-substituted-2-hydroxyalkyl (or mercaptoalkyl)-imidazoles according to a two-step process which comprises reaction of the 2-hydroxyalkyl- or 2-mercaptoalkyl imidazole with phenoxycarbonyl chloride or phenoxythiocarbonyl chloride to produce an imidazolylalkyl phenyl carbonate or phenyl thionocarbonate, and reaction of said carbonate or thionocarbonate with ammonia or with a primary or secondary amine. This process may be represented structurally according to the following flow diagram:

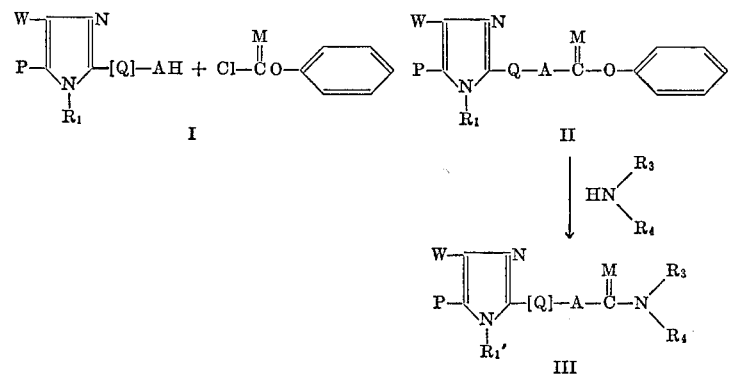

wherein:

$R_1$ is alkyl, suitably loweralkyl, such as, methyl, ethyl, propyl, butyl or pentyl, or the substituted derivatives thereof. The substituent groups on the alkyl group may be aryl, such as phenyl, nitrophenyl or chlorophenyl; oxo; halo, such as chloro or bromo; alkanoyloxy, suitably loweralkanoyloxy, for example, acetoxy, propionoxy, butyroxy, or valeroxy; aralkanoyloxy, suitably phenylalkanoyloxy, such as phenylacetoxy; benzoyloxy; alkoxy, suitably loweralkoxy, such as methoxy, propoxy, or butoxy; aralkoxy, such as, phenylloweralkoxy, suitably, benzoyloxy; carboalkoxy, such as carboloweralkoxy, preferably, carbomethoxy, carboethoxy and carbopropoxy; carboaralkoxy, suitably carboarylloweralkoxy, such as carbobenzoxy; carboxamido, and N-substituted carboxamido, wherein the N-substituents are alkyl, aralkyl and aryl, suitably loweralkyl, such as, methyl, propyl, butyl and pentyl, phenylloweralkyl, such as benzyl and phenyl; carbamoyl; cyano; substituted thio, substituted sulfinyl and substituted sulfonyl, wherein the substituent groups are alkyl, aralkyl, and aryl, suitably loweralkyl, such as, methyl, propyl and butyl, phenylloweralkyl, such as, benzyl or phenyl;

$R_1'$ is as $R_1$ but additionally is hydroxy or carboxy;

W represents nitro, cyano, phenyl or hydrogen and P represents hydrogen or nitro, provided that not more than one of the groups W and P is nitrogen;

Q is selected from the group consisting of alkylene, alkylidene, alkenylene, aralkylene, such as loweralkylene, suitably methylene, propylene, butylene and ethylene, loweralkylidene, such as, ethylidene, propylidene and butylidene, as well as propylene-2-yl, loweralkenylene, such as 2-propenylene and phenylloweralkylene, such as phenylmethylene;

A and M each represent oxygen or sulfur;

The N-substituents of the carbamate group designated as $R_3$ and $R_4$ include the following:

Hydrogen; alkyl, suitably loweralkyl, such as, methyl, ethyl, propyl or butyl, or substituted alkyl, wherein the substituents of the alkyl group may be halo, such as chlorine or bromine; hydroxy; alkoxy, suitably loweralkoxy, such as methoxy, propoxy, or butoxy; carboalkoxy, suitably carboloweralkoxy such as, carbomethoxy, carboethoxy and carbopropoxy; carboaralkoxy, such as, carbophenylloweralkoxy, suitably carbophenylacetoxy; carbamoyl; alkanoyloxy such as, loweralkanoyloxy, suitably acetoxy, propionoxy or butyroxy; aralkanoyloxy, for example, phenylloweralkanoyloxy, such as, benzoyloxy; sulfamoyl and the N-substituted derivatives thereof wherein the N-substituents may be:

N-alkyl, suitably N-loweralkyl, such as, N-methyl, N-propyl, N-pentyl, N-aryl, such as N-phenyl or N-aralkyl such as N-phenylloweralkyl, such as N-benzyl; mercapto and substituted mercapto wherein the substituents may be:

Alkyl, such as, loweralkyl, for example, methyl, ethyl, and propyl, and aralkyl suitably, phenylloweralkyl, such as, benzyl; thioncarbamoyl; substituted dithiocarbamoyl, wherein the substituents may be:

N,N-dialkyl, such as N,N-dimethyl, N,N-diethyl, N,N-dipropyl, N,N-diaralkyl, such as N,N-di(phenylloweralkyl), suitably N,N-dibenzyl, or N,N-diaryl, such as, N,N-diphenyl; amino; or substituted amino, wherein the substituents may be:

Dialkyl, suitably diloweralkyl, such as dimethyl, dibutyl, or dipentyl, or diaralkyl, such as diphenylloweralkyl, suitably benzyl; heterocycloalkyl, wherein the ring contains at least one nitrogen atom, suitably a 4- or 5-membered saturated heterocycloalkyl, for example, morpholino, thiamorpholino, piperidino, piperazino, 4-methylpiperazino, imidazolidino; aryl or substituted aryl such as phenyl, naphthyl, p-fluorophenyl, p-nitrophenyl, and p-chlorophenyl, aralkyl such as benzyl or phenylethyl; hydroxy and substituted hydroxy, wherein the substituents are:

Alkyl, suitably loweralkyl, for example, methyl, ethyl, butyl and pentyl; aralkyl, such as phenylloweralkyl, suitably benzyl and aryl, for example, phenyl; amino and substituted amino, wherein the preferred substituents are:

Carbamoyl and thioncarbamoyl; alkylidene, such as, loweralkylidene, isopropylidene, 2-butyridene, 3-pentylidene, and 2-ethylidene; aralkylidene, for example, phenylloweralkylidene, such as, 1-phenylpropylidene; acyl, for example, alkanoyl, suitably loweralkanoyl, such as, phenyl, acetyl, propionyl, butyryl, or valeryl; aralkanoyl, suitably phenylloweralkanoyl, such as, benzoyl; cyanoalkanoyl, suitably cyanoloweralkanoyl, such as, cyanoacetyl or cyanopropionyl; alkenoyl, suitably loweralkenoyl, such as, acryloyl or crotonoyl; and aroyl, such as benzoyl; diaminophosphoryl and the N-substituents thereof, wherein the preferred substituents are:

Alkyl, suitably loweralkyl, such as, methyl, phenyl, propyl and butyl; and aralkyl, suitably phenylloweralkyl, such as benzyl; also within the scope of the present invention are those compounds where the carbamoyl group has the substructure

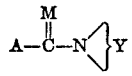

wherein A is oxygen or sulfur, M is oxygen, sulfur, imino or substituted imino and the group N<}Y is heterocycloalkylcarbonyl, wherein the heterocycloalkyl ring contains at least one nitrogen atom, suitably a 4- or 5-membered saturated heterocycloalkyl, for example, morpholino, thiamorpholino, piperidino, piperazino, 4-methylpiperazino, imidazolidino, and pyrrolidino.

According to the first step of this novel synthesis, a 1-$R_1$-2-QAH-5-nitroimidazole and either a phenoxy carbonyl halide of phenoxy thiocarbonyl halide such as phenoxy carbonyl chloride or phenoxy thiocarbonyl chloride or the respective bromides are reacted together in an appropriate solvent medium in the presence of an acid binding agent. These carbonyl chloride reactants are frequently referred to in the art, and in this description, as phenyl chloroformate and phenyl thionochloroformate, respectively. It is convenient to employ an excess of organic tertiary amine such as pyridine, a picoline or lutidine, trialkylamine or dimethylaniline as both solvent and acid binding agent. This however, is not essential and other solvents that are inert under the reaction conditions may be utilized, examples of which are tetrahydrofuran, dioxane, toluene, chloroform and the like, together with sufficient tertiary amine or alkali metal hydroxide to bind the liberated acid.

It is preferred to employ a slight molar excess of carbonyl halide, suitably carbonyl chloride or thiocarbonyl halide, such as thiocarbonyl chloride reactant for best results in most cases, although essentially equimolar amounts give satisfactory yields and may be employed if desired. Molar excesses of about 1–10% and preferably 2–5% of phenyl chloroformate or phenyl thionochloroformate give highly satisfactory results. The process is generally carried out at temperatures of between about $-15°$ C. and $50°$ C. The reaction is an exothermic one, and it is preferred to contact the reactants in the cold, i.e. at temperatures of from about $-15°$ C. to $+15°$ C., and then to complete the reaction at temperatures of room temperature to $+50°$ C. after the initial exothermic phase is completed. Under these conditions, the formation of the desired carbonate or thionocarbonate of Formula II above is substantially complete in from ½ to 5 hours when Q is methylene. When Q represents 1-ethylene, longer reaction times of up to about 30 hours are optimum.

At the completion of the reaction, the carbonate or thionocarbonate of Formula II may be recovered as a solid, utilizing techniques known to those skilled in this art. Generally, the carbonates and thionocarbonates are insoluble in water and one convenient method for their recovery is to quench the reaction mixture in ice water thereby causing precipitation of the desired compounds. When such products are to be converted directly to carbamates, they may be used directly without further purification. Actually, extensive purification of the phenyl thionocarbonates is avoided because such compounds tend to instability.

Representative examples of the new and novel phenyl carbonates and phenyl thionocarbonates that may be obtained in this fashion are 1-methyl-2-hydroxymethyl-5-nitroimidazole phenyl carbonate, 1-ethyl-2-hydroxymethyl-5-nitroimidazole phenyl thionocarbonate, 1-propyl-2-hydroxymethyl-5-nitroimidazole phenyl thionocarbonate, 1-methyl - 2-(1-hydroxyethyl)-5-nitroimidazole phenyl carbonate, 1 - (2 - acetoxyethyl) - 2-hydroxymethyl-5-nitroimidazole phenyl carbonate, and 1 - methyl-2-mercaptomethyl-5-nitroimidazole phenyl carbonate.

In accordance with the second step of this novel process, the phenyl carbonates and phenyl thioncarbonates of Formula II are converted to 1-substituted-imidazol-2-yl-alkyl carbamates by contacting them with an amine in a suitable solvent medium. The choice of amine is not critical and there may be employed ammonia itself, in which case the parent carbamate or thiocarbamate is produced, or a primary or secondary amine, in which case a substituted carbamate or thiocarbamate is obtained. The nature of the amine reactant will, of course, determine the meanings of the symbols $R_3$ and $R_4$ (in Formula III above) in the carbamate end product.

When the parent carbamate is to be formed, i.e. where $R_1$ and $R_2$ represent hydrogen, the phenyl carbonate or phenyl thionocarbonate is reacted with ammonia. In those cases where a 1-loweralkyl imidazole carbamate is being prepared (i.e. where $R_3$ and $R_4$ above are loweralkyl and M is oxygen), it is convenient to carry out the reaction in a large excess of liquid ammonia which also serves as the solvent medium. This may be done at room temperature in a closed system, but it is preferred to carry out the reaction at about $-35°$ to $-40°$ C., i.e. the boiling point of liquid ammonia. At the conclusion of the reaction, the ammonia is allowed to boil away and the 1-loweralkyl-5-nitroimidazol-2-ylalkyl carbamate which remains is recovered and purified by standard techniques. In preparing the unsubstituted thionocarbamate, however, best results are achieved by using about 2 moles of ammonia per mole of thionocarbonate, and performing the reaction at about room temperature in a solvent such as chloroform or dioxane. It has been found convenient to remove the phenol formed as a by product by extraction with ether-petroleum ether in which the carbamate is essentially insoluble.

When other amines are employed, it is preferred to carry out the process in an organic solvent inert under the reaction conditions. Solvents such as dioxane, chloroform, tetrahydrofuran or ethyleneglycol dimethylether are typical examples of suitable solvents. Good results are obtained by employing either equimolar quantities of reactants or using a molar excess of the amine, with from about 1.5–4 moles of amine per mole of phenyl carbonate or phenyl thionocarbonate being preferred. The reaction is substantially complete in from about one to 8 hours at room temperature, although the optimum conditions will vary slightly depending upon the amine reactant.

The method of this invention gives high yields of imidazolealkyl carbamates of Formula III. Under preferred conditions, the yields are in excess of 75% of theoretical.

In cases where the intermediate phenyl carbonate of Formula II above has an acyloxyalkyl substituent at the 1-position of the imidazole ring (i.e. $R_1$ is acyloxyalkyl), this ester must, of course, be hydrolyzed with base when the 1-hydroxyalkylated compound is desired. This is accomplished by employing an excess of amine in the carbamate-yielding reaction, and carrying out the reaction at between about 15–40° C. in a solvent medium. Similarly, where a 1-carboxyalkylated compound is produced in this process and it is desired to have the corresponding 1-carboxy compound, this may be accomplished by employing an excess of amine in the carbamate yielding reaction under the conditions given above.

Representative examples of imidazolylalkyl carbamates which may be prepared by this method are: 1-methyl-5-nitroimidazol - 2-ylmethyl carbamate; 1-ethyl-5-nitroimidazol-2-ylmethyl p-fluorophenyl carbamate; 1-(2-hydroxyethyl) - 5-nitroimidazol-2-ylmethyl N-(2-methoxyethyl) carbamate, 1 - (1-methyl-5-nitroimidazol-2-yl)ethyl carbamate, 1 - methyl-5-nitroimidazol-2-ylmethyl thionocarbamate, 1 - propyl-5-nitroimidazol-2-ylmethyl thiolcarbamate, 1-methyl-5-nitroimidazol-2-ylmethyl hydroxycarbamate and 1-(2-hydroxypropyl)-5-nitroimidazol-2-ylmethyl methylcarbamate.

The following examples are given for the purpose of illustration and not by way of limitation.

EXAMPLE 1

23.5 g. of 1-methyl-5-nitroimidazol-2-ylmethyl phenyl carbonate is added to 100 ml. of stirred liquid ammonia in a flask cooled to about −60° C. The addition is carried out at −60° C. over 5 minutes. The mixture is warmed to between −33° C. and −35° C. and stirred under gentle reflux for 6 hours. The ammonia is then allowed to boil off over a 15 hour period, and the flask then placed under 10–14 mm. vacuum for 10 minutes to remove the last traces of ammonia.

A mixture of 25 ml. of ether and 25 ml. of petroleum ether is then added to the reaction flask and the mixture stirred for 30 minutes. The solid 1-methyl-5-nitro-imidazol-2-ylmethyl carbamate is removed by filtration, washed with 25 ml. of a 1:1 ether-petroleum ether mixture, and dried in vacuo at 40° C. 16.8 g. of carbamate are obtained, M.P. 161.5–164° C. Recrystallization from hot acetone (containing 5% water) yields substantially pure material, M.P. 167.5–168.5° C.

EXAMPLE 2

1-(1-methyl-5-nitroimidazol-2-yl)ethyl carbamate 3.26 g. of phenyl chloroformate is added over a 20 minute period to a solution of 3.65 g. of 1-methyl-2-(1-hydroxyethyl)-5-nitroimidazole in 11 ml. of pyridine. The mixture is then allowed to warm to room temperature and then stirred at room temperature for about two days. It is then poured into 60 ml. of ice water and the resulting solid product recovered by filtration to give 5.9 g. of 1-(1-methyl-5-nitroimidazol-2-yl)ethyl phenyl carbonate. The product is recrystallized from diethyl ether to give substantially pure material, M.P. 79–83° C.

0.46 g. of the carbonate obtained immediately above is dissolved in 10 ml. of chloroform and the resulting solution added dropwise to 10 ml. of liquid ammonia cooled in a Dry Ice bath. It is stirred for one-half hour and the mixture then allowed to warm to room temperature. The resulting solid product is removed by filtration. The filtrate is evaporated to dryness to give additional product. These two solid materials are combined and recrystallized from 5 ml. of ethyl acetate to give 0.2 g. of 1-(1-methyl-5-nitroimidazol-2-yl)ethyl carbamate, M.P. 156–158.5° C.

EXAMPLE 3

1-methyl-5-nitroimidazol-2-ylmethyl thionocarbamate 5.17 g. of phenoxythiocarbonyl chloride is added dropwise to a cold solution of 4.71 g. of 1-methyl-2-hydroxymethyl-5-nitroimidazole in 15 ml. of pyridine. During addition, the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice water mixture. A gummy precipitate forms. The water is decanted from this precipitate and the solid triturated with 70 ml. of methanol. 70 ml. of water is added and the solid product removed by filtration. It is recrystallized from benzene-hexane to give 1-methyl-5-nitroimidazol-2-ylmethyl phenyl thionocarbonate, M.P. 92–98° C. On further recrystallization from benzene-hexane, the product melts at 103–105.5° C.

48.6 ml. of 1 M ammonia in chloroform is added to a solution of 6.98 g. of 1-methyl-5-nitroimidazol-2-ylmethyl phenyl thioncarbonate in 100 ml. of chloroform. The resulting solution is allowed to stand for about 14 hours at room temperature and the solid product removed by filtration. It is essentially pure 1-methyl-5-nitroimidazol-2-ylmethyl thionocarbamate, M.P. 155–159° C. The product may be further purified by recrystallization from ethyl acetate.

EXAMPLE 4

1-methyl-5-nitroimidazol-2-ylmethyl N-chloropropylcarbamate 1.5 g. of chloropropylamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solid product is removed by filtration. It is recrystallized from ethyl acetate to give 1-methyl-5-nitroimidazol-2-ylmethyl N-chloropropylcarbamate.

In accordance with the above procedure, but using bromopropylamine, chlorobutylamine, chloropentylamine or bromohexylamine in place of chloropropylamine, there is obtained the corresponding 1-methyl-5-nitroimidazol-2-ylmethyl N-bromopropylcarbamate, 1-methyl-5-nitroimidazol - 2-ylmethyl N-chlorobutylacarbamate, 1-methyl-5-nitroimidazol-2-ylmethyl N-chloropentylcarbamate and 1 - methyl - 5-nitroimidazol-2-ylmethyl N-bromohexylcarbamate.

EXAMPLE 5

1-methyl-5-nitroimidazol-2-ylmethyl N-acetoxyethylcarbamate 0.05 mole of O-acetyl ethanolamine is dissolved in a mixture of 50 ml. of acetic anhydride and 15 ml. of glacial acetic acid and heated under reflux for 5 hours with 0.05 mole of 1-methyl-5-nitroimidazol-2-ylmethyl phenyl carbonate. The solvent is removed under reduced pressure and the residue extracted with ethyl acetate, washed with dilute aqueous sodium bicarbonate and water, and dried over sodium sulfate. The ethyl acetate is removed under reduced pressure and the residue recrystallized from acetone or ethyl acetate to yield 1-methyl-5-nitroimidazol-2-ylmethyl N-acetoxyethylcarbamate.

In accordance with the above procedure, but starting with O-acetyl propanolamine or O-acetyl butanolamine in place of O-acetyl ethanolamine, there is obtained the corresponding 1-methyl-5-nitroimidazol-2-ylmethyl N-acetoxypropylcarbamate or 1-methyl-5-nitroimidazol-2-ylmethyl N-acetoxybutylcarbamate.

In accordance with the above procedure, but starting with O-propionyl ethanolamine, O-butyryl ethanolamine, or O-valeryl ethanolethanolamine, in place of O-acetyl methanolamine, there is obtained the corresponding 1-methyl-5-nitroimidazol-2-ylmethyl N-propionoxyethylcarbamate, 1-methyl-5-nitroimidazol-2-ylmethyl-N-butyroxyethylcarbamate, and 1-methyl-5-nitroimidazol-2-ylmethyl N-valeroxyethylcarbamate.

EXAMPLE 6

1-methyl-5-nitroimidazol-2-ylmethyl N-carbamoyloxy methyl carbamate 0.1 mole of carbamoyloxymethylamine is added at 15° C. to 0.1 mole of 1-methyl-5-nitroimidazol-2-ylmethyl phenylcarbonate in 10 ml. of chloroform. The mixture is stirred for 7 hours and at the end of this time, the solid product is removed by filtration. It is recrystallized from ethyl acetate to give 1-methyl-5-nitroimidazol-2-ylmethyl N-carbamoyloxymethyl carbamate.

In accordance with the above procedure, but starting with carbamoyloxy ethylamine, carbamoyloxy propylamine or carbamoyloxy butylamine, in place of carbamoyloxy methylamine, there is obtained the corresponding 1-methyl-5-nitroimidazol-2-ylmethyl N-carbamoyloxyethyl carbamate, 1-methyl-5-nitroimidazol-2-ylmethyl N-carbamoyloxypropyl carbamate and 1-methyl-5-nitroimidazol-2-ylmethyl N-carbamoyloxybutyl carbamate.

In accordance with the above procedure, but starting with the corresponding N-alkyl, N-phenyl and N-phenylalkyl carbamoyloxy alkylamine, there are obtained the corresponding 1-methyl-5-nitroimidazol-2-ylmethyl-N-alkyl-phenyl- and phenylalkyl-alkyl carbamates.

EXAMPLE 7

1-methyl-5-nitroimidazol-2-ylmethyl-4-morpholine carboxylate 0.1 mole of morpholine is added to a solution of 0.5 mole of 1-methyl-5-nitroimidazol-2-ylmethyl phenyl-carbonate in 10 ml. of chloroform. The mixture is stirred for 7 hours and at the end of this time, the solid product is removed by filtration. It is recrystallized from ethyl acetate to give 1-methyl-5-ntiroimidazol-2-ylmethyl-4-morpholine carboxylate.

In accordance with the above procedure, but starting with pyrrolidine, piperidine, piperazine, 4-methyl-piperazine and thiamorpholine, in place of morpholine, there is obtained the corresponding 1-methyl-5-nitroimidazol-2-ylmethyl-1-pyrrolidine carboxylate, 1-methyl-5-nitroimidazol-2-ylmethyl-1-piperidine carboxylate, 1-methyl-5-nitroimidazol-2-ylmethyl-N'-methyl-N⁴-piperazine carboxylate and 1-methyl-5-nitroimidazol-2-ylmethyl-4-thiamorpholine carboxylate.

EXAMPLE 8

1-methyl-5-nitroimidazol-2-ylmethyl carbazate

A mixture of 5 g. of 1-methyl-5-nitroimidazol-2-ylmethyl phenyl carbonate, 0.5 ml. of 95% hydrazine and 25 ml. of chloroform is stirred at room temperature for one hour. At the end of this time, the solid is removed by filtration to give 3.8 g. of material, M.P. 101–105° C. This product is dried in vacuo at 68° C. to remove phenol and then recrystallized from water to give substantially pure 1-methyl-5-nitroimidazol-2-ylmethyl carbazate, M.P. 135–140° C.

In accordance with the above procedure but starting with carbamoyl hydrazine, isopropylidene hydrazine, phenylisopropylidene hydrazine, acetyl hydrazine, propionyl hydrazine, phenylacetyl hydrazine and benzoyl hydrazine in place of hydrazine, there is obtained the corresponding 1-methyl-5-nitroimidazol-2-ylmethyl carbamoyl carbazate, 1-methyl-5-nitroimidazol-2-ylmethyl isopropylidene carbazate, 1-methyl-5-nitroimidazol-2-ylmethyl phenylisopropylidene carbazate, 1-methyl-5-nitroimidazol-2-ylmethyl acetyl carbazate, 1-methyl-5-nitroimidazole-2-ylmethyl propionyl carbazate, 1-methyl-5-nitroimidazol-2-ylmethyl phenacetyl carbazate and 1-methyl-5-nitroimidazol-2-ylmethyl benzoyl carbazate.

EXAMPLE 9

1-(1′methyl-5′-nitroimidazol-2′-yl)ethyl carbamate

A solution of 0.01 mole of 1-methyl-2-(1′-hydroxyethyl)-5-nitroimidazol in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(1′-methyl-5′-nitroimidazol-2′-yl)-ethyl phenyl carbonate is separated by filtration.

A solution of 0.005 mole of 1-(1′-methyl-5′-nitroimidazol-2′-yl)ethyl phenyl carbonate in 10 ml. of chloroform is cooled in an ice-bth, and is saturated with dry ammonia. It is allowed to stand for 5 days at 5° C. 1 - (1′ - methyl-5′ - nitroimidazol-2′-yl)-ethyl carbamate, M.P. 156.5–160° C., is obtained as a crystalline precipitate.

EXAMPLE 10

1-methyl-5-nitroimidazol-2-ylmethyl N-2′-hydroxy ethylcarbamate 1.22 g. of ethanolamine is added at 15° C. to a solution of 2.93 g. of 1-methyl-5-nitroimidazole-2-ylmethyl phenylcarbonate in 10 ml. of chloroform. The mixture is stirred for 7 hours and at the end of this time, the solid product is removed by filtration. Recrystallization from ethyl acetate gives 1-methyl-5-nitroimidazol-2-ylmethyl N-2′-hydroxyethyl carbamate; M.P. 132–135° C.

In accordance with the above procedure, but starting with propanolamine, butanolamine, in place of ethanolamine, there is obtained the corresponding 1-methyl-5-nitroimidazol-2-ylmethyl N-3′-hydroxypropylcarbamate, and 1-methyl-5-nitroimidazol-2-ylmethyl N-hydroxybutylcarbamate.

EXAMPLE 11

1-methyl-5-nitroimidazol-2-ylmethyl N-ethoxyethylcarbamate 1.78 g., (0.02 mole) of 2-ethoxyethylamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solution is evaporated to dryness. The residue is slurried with water and the solid product after filtration, is recrystallized from ethanol-water to give 1-methyl - 5 - nitroimidazol-2-ylmethyl N-ethoxyethylcarbamate.

In accordance with the above procedure, but starting with 3-ethoxypropylamine, 4-ethoxybutylamine, 5-ethoxypentylamine, and 6-ethoxyhexylamine, in place of 2-ethoxyethylamine, there is obtained the corresponding 1-methyl - 5 - nitroimidazol-2-ylmethyl N-3-ethoxypropylcarbamate, 1 - methyl - 5 - nitroimidazol-2-ylmethyl N-4-ethoxybutylcarbamate, 1 - methyl - 5 - nitroimidazol-2-ylmethyl N-5-ethoxypentylcarbamate, and 1-methyl-5-nitroimidazol-2-ylmethyl N-6-ethoxyhexylcarbamate.

EXAMPLE 12

1-methyl-5-nitroimidazol-2-ylmethyl N-carbethoxymethylcarbamate 13.8 g., (0.05 mole) of 1-methyl-5-nitroimidazol-2-ylmethyl phenylcarbonate is dissolved in 100 ml. ethanol containing .05 mole of glycine ethyl ester. To this solution is added 10 g. (0.05 mole) of triethylamine. After standing for 24 hours, at 15° C. the solution is concentrated under reduced pressure. The residue is dissolved in ethyl acetate and the solution washed with water, dried and the solvent removed under reduced pressure. The residue is recrystallized from ethyl acetate/ether to yield 1-methyl-5-nitroimidazol-2-ylmethyl N-carbethoxymethylcarbamate.

In accordance with the above procedure, but starting with glycine propyl ester, glycine butyl ester, α-alanine methyl ester, α-alanine pentyl ester, and β-alanine ethyl ester, in place of glycine ethyl ester, there is obtained the corresponding 1-methyl-5-nitroimidazol-2-ylmethyl N-carbopropoxymethylcarbamate, 1-methyl-5-nitroimidazol-2-ylmethyl N-carbobutoxymethylcarbamate, 1 - methyl - 5 - nitroimidazol-2-ylmethyl N - 1 - carbomethoxyethylcarbamate, 1-methyl-5-nitroimidazol-2-ylmethyl N-1-carbopentoxyethylcarbamate, and 1-methyl-5-nitroimidazol-2-ylmethyl N-2-carbethoxyethylcarbamate.

EXAMPLE 13

1-methyl-5-nitroimidazol-2-ylmethyl N-carbamoylmethylcarbamate 13.8 g., (0.05 mole) of 1-methyl-5-nitroimidazol-2-ylmethyl phenylcarbonate is dissolved in 100 ml. ethanol containing .05 mole of glycine amide. To this solution is added 10 g. (0.05 mole) of triethylamine. After standing for 24 hours, at 15° C. the solution is concentrated under reduced pressure. The residue is dissolved in ethyl acetate, washed with water, dried and the solvent removed under reduced pressure. The residue is recrystallized from ethyl acetate/ether to yield 1-methyl-5-nitroimidazol-2-ylmethyl N-carbamoylmethylcarbamate.

In accordance with the above procedure, but starting wih α-alanine amide and β-alanine amide, in place of glycine amide, there is obtained the corresponding 1-methyl-5-nitroimidazol-2-ylmethyl N-1 - carbamoylethylcarbamate and 1-methyl-5-nitroimidazol-2-ylmethyl N-2-carbamoylethylcarbamate.

EXAMPLE 14

1-methyl-5-nitroimidazol-2-ylmethyl N-carbamoylmethyl-N-ethylcarbamate 13.8 g., (0.05 mole) of 1-methyl-5-nitroimidazol-2-ylmethyl phenylcarbonate is dissolved in 100 ml. ethanol containing .05 mole of glycine N-ethylamide. To this solution is added 10 g. (0.05 mole) of triethylamine. After standing for 24 hours, at 15° C. the solution is concentrated under reduced pressure. The residue is dissolved in ethyl acetate, washed with water, dried and the solvent removed under reduced pressure. The residue is recrystallized from ethyl acetate/ether to yield 1-methyl-5-nitroimidazol-2-ylmethyl N-carbamoylmethyl N - ethylcarbamate.

In accordance with the above procedure, but starting with glycine N-propylamide, glycine N-butylamine, glycine N-phenylamide, or glycine N-benzylamide, in place of ethyl glycine amide, there is obtained the corresponding 1-methyl-5-nitroimidazol-2-ylmethyl N-carbamoylmethyl N-propylcarbamate, 1-methyl-5-nitroimidazol-2 - ylmethyl N-carbamoylmethyl N-butylcarbamate, 1-methyl-5-nitroimidazol-2-ylmethyl N-carbamoylmethyl N-phenylcarbamate, 1-methyl-5-nitroimidazol-2-ylmethyl N-carbamoylmethyl N-benzylcarbamate.

EXAMPLE 15

1-methyl-5-nitroimidazol-2-ylmethyl N-2′-sulfonamidoethylcarbamate

.05 mole of 1-methyl-5-nitroimidazol-2-ylmethyl phenylcarbonate is dissolved in ethanol containing .05 mole of 2-aminoethylsulfonamide and 0.05 mole triethylamine. After 24 hours at 15° C., the solution is evaporated. Trituration with water causes the crystallization of 1-methyl-5-nitroimidazol-2-ylmethyl N-2′-sulfonamideethylcarbamate.

In accordance with the above procedure, but using 3-aminopropylsulfonamide, 4-aminobutylsulfonamide and 5-aminopentylsulfonamide, in place of 2-aminoethylsulfonamide, there is obtained the corresponding 1-methyl-5-nitroimidazol-2-ylmethyl N-3′-sulfonamidopropylcarbamate, 1-methyl-5-nitroimidazol-2-ylmethyl N-4′-sulfonamidobutylcarbamate, and 1-methyl-5-nitroimidazol-2-ylmethyl N-5′-sulfonamidopentylcarbamate.

EXAMPLE 16

1-methyl-5-nitroimidazol-2-ylmethyl N-2′-(N′,N′-diethylsulfonamido)ethylcarbamate .05 mole of 1-methyl-5-nitroimidazol-2-ylmethyl phenylcarbonate is dissolved in ethanol containing .05 mole of 2-aminoethylsulfonic acid diethylamide, and 0.05 mole triethylamine. After 24 hours at 15° C., the solution is evaporated. Trituration with water causes the crystallization of 1-methyl-5-nitroimidazol-2-ylmethyl 2′-(N′,N′-diethylsulfonamido)ethylcarbamate.

In accordance with the above procedure, but starting with 2-aminoethylsulfonic acid dipropylamide, 2-aminoethylsulfonic acid diphenylamide, or 2-aminoethylsulfonic acid dibenzylamide, in place of 2-aminoethylsulfonic acid diethylamide, there is obtained the corresponding 1-methyl-5-nitroimidazol-2-ylmethyl 2′-(N′,N′-dipropylsulfonamido)-ethylcarbamate, 1-methyl-5-nitroimidazol-2-ylmethyl 2′-(N′,N′ - diphenylsulfonamido)ethylcarbamate, and 1-methyl-5-nitroimidazol-2-ylmethyl 2′ - (N′,N′ - dibenzylsulfonamido)-ethylcarbamate.

EXAMPLE 17

1-methyl-5-nitroimidazol-2-ylmethyl N-mercaptoethylcarbamate 1.54 g., (0.02 mole) of 2-mercaptoethylamine is added at 15° C. to a solution of 2.77 g. of 1-methyl-5-nitroimidazol-2-ylmethyl phenylcarbonate in 10 ml. of chloroform. The mixture is stirred for 7 hours and at the end of this time, the solid product is removed by filtration. Recrystallization from ethanol gives 1-methyl-5-nitroimidazol-2-ylmethyl N-2′-mercaptoethylcarbamate.

In accordance with the above procedure, but starting with 3-mercaptopropylamine and 4-mercaptobutylamine, in place of 2-mercaptoethylamine, there is obtained the corresponding 1-methyl-5-nitroimidazol-2-ylmethyl N-3′-mercaptopropylcarbamate and 1-methyl-5-nitroimidazol-2-ylmethyl N-4′-mercaptobutylcarbamate.

EXAMPLE 18

1-methyl-5-nitroimidazol-2-ylmethyl N-ethylthioethylcarbamate 2.12 g. (0.02 mole) of ethylthioethylamine is added at 15° C. to a solution of 2.77 g. of 1-methyl-5-nitroimidazol-2-ylmethyl phenylcarbonate in 10 ml. of chloroform. The mixture is stirred for 7 hours and then evaporated to dryness. The residue is triturated with ether and the solid product is removed by filtration. Recrystallization from ethanol gives 1-methyl-5-nitroimidazol-2-ylmethyl N-2′-ethylthioethylcarbamate.

In accordance with the above procedure, but starting with 2-methylthioethylamine, 2-propylthioethylamine, 2-butylthioethylamine, or 2-benzylthioethylamine, in place of 2-ethylthioethylamine, there is obtained the corresponding 1-methyl-5-nitroimiadozl-2-lymethyl N-2′-methylthioethylcarbamate, 1-methyl-5-nitroimidazol-2-ylmethyl N-2′- propylthioethylcarbamate, 1-methyl-5-nitromidiazol-2-ylmethyl N-2′-butylthioethylcarbamate, and 1 - methyl - 5 - nitroimidazol-2-ylmethyl N-2′-benzylthioethylcarbamate.

EXAMPLE 19

1-methyl-5-nitroimidazol-2-ylmethyl N-thioncarbamoylmethylcarbamate 13.8 g. (0.05 mole) of 1-methyl-5-nitroimidazol-2-ylmethyl phenylcarbonate is dissolved in 100 ml. ethanol containing glycinethioamide (4.5 g., 0.05 mole), and 5.1 g. (0.05 mole) of triethylamine. After standing for 24 hours, at 15° C. the solution is concentrated under reduced pressure. The residue is dissolved in ethyl acetate, washed with water, dried. The solvent is removed under reduced pressure and the residue is recrystallized from ethyl acetate/ether to yield 1-methyl-5-nitroimidazol-2-ylmethyl N-thioncarbamoylmethylcarbamate.

In accordance with the above procedure but starting with α-alaninethioamide, or β-alaninethioamide, in place of glycinethioamide, there is obtained the corresponding 1 - methyl - 5-nitroimidazol-2-ylmethyl N-1'-thioncarbamoylethylcarbamate and 1-methyl - 5 - nitroimidazol - 2 - ylmethyl N-2'-thioncarbamoylethylcarbamate.

EXAMPLE 20

1-methyl-5-nitroimidazol-2-ylmethyl N-(aminoethyl)carbamate 15.5 g. (0.02 mole) of 1 - methyl - 5 - nitroimidazol-2-methyl phenylcarbonate is dissolved in 70 ml. of chloroform and 0.06 mole of ethylene diamine is added. The mixture is heated under reflux for 5 hours, cooled and allowed to stand for 18 hours. 170 ml. of chloroform is added and the mixture extracted with saturated aqueous potassium bicarbonate solution. The chloroform extract is washed with water and the solvent removed under reduced pressure. A portion (0.1 g.) of the residual brown oil is dissolved in methylethyl ketone. A solution of 8.53 g. of p-toluenesulfonic acid in 80 ml. of methylethyl ketone is prepared. An excess of the p-toluenesulfonic acid solution (i.e. more than 2 moles per mole of concentrate derivative) is added and the mixture allowed to cool. The solution is evaporated to dryness, 5 ml. of methylethyl ketone added. After standing at 0° C. the di-p-toluenesulfonic acid salt of 1-methyl-5-nitroimidazol-2-ylmethyl N-(aminoethyl)carbamate is obtained.

EXAMPLE 21

1-methyl-5-nitroimidazol-2-ylmethyl N-(N',N'-diethylaminoethyl)carbamate 15.5 g. (0.02 mole) of 1-methyl - 5 - nitroimidazol - 2-methyl phenylcarbonate is dissolved in 70 ml. of chloroform and 2.68 g. (.023 mole) of diethylaminoethylamine is added. The mixture is heated under reflux for 5 hours, cooled and alowed to stand for 18 hours. Chloroform (170 ml.) is added and the mixture extracted with saturated aqueous potassium bicarbonate solution. The chloroform extract washed with water and the solvent removed under reduced pressure. A portion (0.1 g.) of the residual brown oil is dissolved in methylethyl ketone. A solution of 8.53 g. of p-toluenesulfonic acid in 80 ml. of methylethyl ketone is prepared. An excess of the p-toluenesulfonic acid solution (i.e. more than 2 moles per mole of carbonate derivative) and the mixture allowed to cool. The solution is evaporated to dryness, 5 ml. of methylethyl ketone added. After standing at 0° C. the di-p-toluenesulfonic acid salt of 1-methyl-5-nitroimidazol-2-ylmethyl N - (N',N'- diethylaminoethyl)carbamate, M.P. 101–103° C., is obtained.

In accordance with the above procedure, but starting with 3-dimethylaminopropylamine and dibenzylaminoethylamine, in place of diethylaminoethylamine, there is obtained the corresponding 1-methyl-5-nitroimidazol-2-ylmethyl N-(3'-N'-dimethylaminopropyl)carbamate, and 1-methyl-5-nitroimidazol-2-ylmethyl N-(N'-dibenzylaminoethyl)carbamate.

EXAMPLE 22

1-methyl-5-nitroimidazol-2-ylmethyl N-hydroxycarbamate 0.386 g. of sodium is dissolved in 40 ml. of methanol and the solution cooled in an ice bath. 1.17 g. of hydroxylamine hydrochloride is added to the cold methanol solution. To the resulting mixture there is added over a period of 45 minutes 2.33 g. of 1-methyl-5-nitroimidazol-2-ylmethyl phenyl carbonate in 60 ml. of methanol. The resulting mixture is held for 15 hours at refrigerator temperature and at the end of this time, the solid material present is removed by filtration. The solid is washed with alcohol and then with hexane, and dried to give 1-methyl-5-nitroimidazol-2-ylmethyl N - hydroxycarbamate; M.P. 189–190° C.

In accordance with the above procedure, but starting with N-methylhydroxylamine hydrochloride, N-propylhydroxylamine hydrochloride, N-phenylhydroxylamine hydrochloride, and N-benzylhydroxylamine hydrochloroide, in place of hydroxylamine, there is obtained the corresponding 1-methyl-5-nitroimidazol-2-ylmethyl N-methyl - N - hydroxycarbamate, 1-methyl-5-nitroimidazol-2-ylmethyl N-propyl-N-hydroxycarbamate, 1-methyl-5-nitroimidazol-2-ylmethyl N-phenyl-N-hydrocarbamate, and 1-methyl-5-nitroimidazol-2-ylmethyl N-benzyl-N - hydroxycarbamate.

EXAMPLE 23

1-(2'-acetoxyethyl)-5-nitroimidazol-2-ylmethyl N-hydroxy carbamate 3.66 g. of 1-(2'-acetoxyethyl)-5-nitroimidazol-2-ylmethyl phenyl carbonate is dissolved in 20 ml. of methanol and treated with freshly prepared hydroxylamine from .72 g. of hydroxylamine hydrochloride and .6 g. of sodium methoxide in 20 ml. of methanol. The residue is recrystallized from ethanol to yield 1-(2'-acetoxyethyl)-5-nitroimidazol-2-ylmethyl N-hydroxycarbamate; M.P. 153–155° C.

EXAMPLE 24

1-methyl-5-nitroimidazol-2-ylmethyl N-hydroxythioncarbamate 0.56 g. (0.005 mole) of potassium t-butoxide is dissolved in 20 ml. of ethanol and 0.35 g. (0.005 mole) of hydroxylamine hydrochloride is added and the mixture stirred for 5 minutes. 0.732 g. (0.0025 mole) of 1-methyl-5-nitroimidazol-2-ylmethyl phenyl thioncarbonate is added and the mixture allowed to stand for 1 hour. The solvent is removed under reduced pressure, and water added to the residue to yield 1-methyl-5-nitroimidazol-2-ylmethyl N-hydroxythioncarbamate; M.P. 94–95° C. (dec.).

In accordance with the above procedure, but starting with N-methylhydroxylamine, N-propylhydroxylamine, N-phenylhydroxylamine, and N-benzylhydroxylamine, in place of hydroxylamine, there is obtained the corresponding 1-methyl-5 - nitroimidazol-2-ylmethyl N-methyl-N-hydroxythioncarbamate, 1-methyl-5-nitroimidazol-2-ylmethyl N-propyl-N - hydroxythioncarbamte, and 1-methyl-5 - nitroimidazol-2 - ylmethyl N'-benzyl-N'-hydroxythioncarbamate.

The starting materials used in the aforementioned examples may be prepared in the following manner.

Preparation 1.—1-butyl-5-nitroimidazole 2.42 g. (0.214 mole) of 4(5)-nitroimizadole is heated with 25.0 g. (0.11 mole) of n-butyl tosylate for one hour at 180–190° C. and cooled to give a hard solid. The mixture is shaken with 175 ml. of 2.5 N aqueous sodium hydroxide until it is dissolved and diluted with 175 ml. of water to give an oily precipitate. The mixture is extracted with ether; the ether extract washed with 2.5 N aqueous hydrochloric acid and water. The aqueous acid wash is treated with excess aqueous sodium hydroxide and extracted with ether. This latter ether extract is evaporated to dryness and recrystallized from petroleum ether to yield 1-butyl-5-nitroimidazole, M.P. 51–54° C.

In accordance with the above procedure but starting with methyl tosylate, ethyl tosylate and propyl tosylate in place of n-butyl tosylate, there is obtained the corresponding 1-methyl-5 - nitroimidazole, 1-ethyl-5-nitroimidazole, and 1-propyl-5-nitroimidazole.

Preparation 2.—1-allyl-5-nitroimidazole 14.0 g. (0.124 mole) of 4(5)-nitromidazole is heated with 26.3 g. (0.124 mole) of allyl tosylate at 140–150° C. for 15 minutes and cooled. The resultant mixture is dissolved in 150 ml. of 2.5 N sodium hydroxide and diluted with 150 ml. of water. The mixture is extracted with ether and the ether extracts extracted with 2.5 normal aqueous hydrochloric acid. The acid extracts are made basic by the addition of excess aqueous sodium hydroxide and extracted with ether. This latter ether extract is evaporated to dryness to give 1-allyl-5-nitroimidazole as an oil. The 1-allyl-5-nitroimidazole is dissolved in 50 ml. of dry ether and added to a solution of 4.01 g. of p-toluene sulfonic acid hydrate and 200 ml. of ether, the mixture cooled in an ice bath and the precipitate removed by filtration. The precipitate is recrystallized from ethyl acetate to yield 1-allyl-5-nitroimidazolium-p-toluene sulfonate, M.P. 145–149° C.

Preparation 3.—1-phenyl-5-nitroimidazole 10 g. (.069 mole) of 1-phenylimidazole is dissolved in 30 ml. of chloroform and the solution is stirred in an ice bath while 5 g. (.037 mole) of nitronium fluoborate is added in small portions over .5 hour. After stirring for .5 hour at room temperature, the two dark phases are diluted with 200 ml. of chloroform and the mixture extracted with an excess of 1 N hydrochloric acid. The chloroform extract is evaporated and the residue dissolved in acetone-ether (1:1) and chromatographed on 12 g. of a charcoal/Supercel mixture to yield 1-phenyl-5-nitroimidazole, M.P. 150–165° C. Sublimation at less than 1 mm. of mercury pressure and 120° C. raises the melting point to 160–170° C. U.V.

$\lambda_{max.}^{MeOH}$ 291.0 m$\mu$ $\epsilon$ 5000.

Preparation 4.—1-p-nitrophenyl-5-nitroimidazole 1.98 g. (.0137 mole) of 1-phenylimidazole is dissolved in 6 ml. of concentrated sulfuric acid and 3.0 ml. (.07 mole) of fuming nitric acid is added slowly. The mixture is heated in an oil bath at 120° C. for 1 hour, cooled and poured into ice water. The mixture is extracted with chloroform to give a partly crystalline mixture. The aqueous acid phase is made basic and extracted with chloroform to give crystalline 1-p-nitrophenylimidazole. The acid insoluble fraction is repeatedly washed with small portions of chloroform, evaporation of the solvent is followed by filtration of an acetone solution of the residue through celite/charcoal. Evaporation, followed by recrystallization from methanol gives 1-p-nitrophenyl-5-nitroimidazole; M.P. 156.8–158° C. U.V.

$\lambda_{max.}^{MeOH}$ 275.0 m$\mu$ $\epsilon$ 13,100

Preparation 5.—1-(2′-hydroxyethyl)-5-nitroimidazole 78 g. (0.615 mole) of 5 nitroimidazole is dissolved in 1500 ml. of acetic acid upon the addition of 72 ml. (0.57 mole) of boron trifluoride etherate. 175 ml., (3.5 mole) of ethylene oxide in 175 ml. of hexane, in a dropping funnel topped with a cold finger, is added slowly over 1 hour to the above solution maintained at 32–35° C. with a water cooling bath. The mixture is concentrated under high vacuum to 100–150 ml. volume. The residue is diluted with 500 ml. of water, neutralized to pH 7 with aqueous sodium hydroxide, and extracted with 1.5 liters of ethyl acetate. The extract is dried and evaporated to yield 1-(2′-hydroxyethyl)-5-nitroimidazole. It is convenient to isolate the compound as the hydrochloride. Hydrogen chloride is passed through the ethyl acetate extract and 1-(2′-hydroxyethyl)-5-nitroimidazolium hydrochloride is isolated; M.P. 172–175° C.

In accordance with the above procedure but starting with 1,2-epoxypropane, 1,2-epoxybutane, 1,2-epoxypentane, 1,3-epoxypropane, 1,3-epoxybutane and 1,3-epoxypentane in place of ethylene oxide, there is obtained the corresponding 1-(2′-hydroxypropyl)-5-nitroimidazole, 1-(2′-hydroxybutyl)-5-nitroimidazole, 1-(2′-hydroxypentyl)-5-nitroimidazole, 1-(3′-hydroxypropyl)-5-nitroimidazole, 1-(3′-hydroxybutyl)-5-nitroimidazole, and 1-(3′-hydroxypentyl)-5-nitroimidazole.

Preparation 6.—1-(2′-oxopropyl)-5-nitroimidazole 17.1 g. (0.1 mole) of 1-(2′-hydroxypropyl)-5-nitroimidazole is dissolved in 500 ml. of dimethylsulfoxide and heated with 8 ml. of dry pyridine and 4 ml. of trifluoroacetic acid and 61.8 g. (0.3 mole) of dicyclohexylcarbo diimide for 8 hours at 15–20° C. The mixture is treated with excess oxalic acid, filtered and the filtrate evaporated to dryness under vacuum of less than 1 mm. of mercury pressure. The mixture is taken up in water, neutralized with aqueous sodium hydroxide to pH 8–9 and extracted thoroughly with ethyl acetate. The extract after drying over sodium sulfate, is treated with dry gaseous hydrogen chloride and 1-(2′-oxopropyl)-5-nitroimidazolium hydrochloride (M.P. 198–200° C.) is precipitated and removed by filtration. This compound is converted to the free base (M.P. 100° C.) by stirring with a saturated solution of sodium bicarbonate.

In accordance with the above procedure, but starting with 1-(2′-hydroxybutyl)-5-nitroimidazole, 1-(2′-hydroxypentyl) - 5 - nitroimidazole, 1-(3′-hydroxybutyl)-5-nitro- and 1-3(3′-hydroxypentyl)-5-nitroimidazole, imidazole, in place of 1-(2′-hydroxypropyl)-5-nitroimidazole, there is obtained the corresponding 1-(2′-oxobutyl)-5-nitroimidazole, 1-(2′-oxopentyl)-5-nitroimidazole, 1-(3′-oxobutyl)-5-nitroimidazole and 1-(3′-oxopentyl)-5-nitroimidazole.

Preparation 7.—1-(2′-acetoxypropyl)-5-nitroimidazole 11.2 g. (0.4 mole) of 1-(2′-hydroxypropyl)-5-nitroimidazolium hydrochloride is heated under reflux in 100 ml. of acetic anhydride for one hour. The mixture is then concentrated and the residue dissolved in ether. The ether solution treated with anhydrous hydrogen chloride to yield 1-(2′-acetoxypropyl)-5-nitroimidazolium hydrochloride; M.P. 165–175° C.

Preparation 8.—1-(2′-acetoxyethyl)-5-nitroimidazole 55 g. (0.35 mole) of 1-(2′-hydroxyethyl)-5-nitroimidazole is dissolved in 200 ml. of pyridine and treated with 50 ml. of acetic anhydride. The solution is heated under reflux for one hour and then concentrated under reduced pressure to yield 1-(2′-acetoxyethyl)-5-nitroimidazole; M.P. 61–62° C.

In accordance with the above procedure but starting with 1-(2′-hydroxybutyl)-5-nitroimidazole, 1-(2′-hydroxypentyl)-5-nitroimidazole, 1-(3′ - hydroxybutyl - 5-nitroimidazole, 1-(3′-hydroxypentyl) - 5 - nitroimidazole, and 1-(3′-hydroxypropyl)-5-nitroimidazole, in place of 1-(2′-hydroxyethyl)-5-nitrimidazole, there is obtained the corresponding 1 - (2′-acetoxybutyl)-5-nitroimidazole, 1-(2′-acetoxypentyl)-5-nitroimidazole, 1-(3′-acetoxybutyl)-5-nitroimidazole, 1-(3′-acetoxypentyl)-5-nitroimidazole, and 1-(3′-acetoxypropyl)-5-nitroimidazole.

In accordance with the above procedure but using propionic anhydride, butyric anhydride or valeric anhydride in place of acetic anhydride together with any of the aforementioned 1-(2′-hydroxyalkyl)-5-nitroimidazoles, thereis obtained the corresponding 1-(2′-alkanoyloxyalkyl)-5-nitroimidazole.

Preparation 9.—1-(2′-benzoyloxyethyl)-5-nitroimidazole 55 g., (0.35 mole) of 1-(2′-hydroxyethyl)-5-nitroimidazole is dissolved in 150 ml. of water and added to a mixture of 100 ml. of benzoyl chloride and 300 ml. of 2.5 N aqueous sodium hydroxide and agitating vigorously for 3 hours. The mixture is then concentrated under reduced pressure, extracted with ether, the ether extract washed with sodium hydroxide, dried over sodium sulfate and evaporated to yield 1-(2'-benzoyloxyethyl)-5-nitroimidazole.

In accordance with the above procedure but starting with phenylacetyl chloride, propionyl chloride or valeryl chloride in place of benzoyl chloride, there is obtained the corresponding 1 - (2'-phenylacetoxy ethyl)-5-nitroimidazole, 1-(2'-propionoxyethyl)-5-nitroimidazole and 1-(2'-valeroxyethyl)-5-nitroimidazole.

In accordance with the above procedure but starting with any of the 1-(2'-hydroxyalkyl)-5-nitroimidazoles produced in accordance with Preparation 5, there is obtained the corresponding 1-(2'-alkanoyloxyalkyl-5-nitroimidazole.

Preparation 10.—1-ethoxyethyl-5-nitroimidazole 11.3 g., (0.1 mole) of 5-nitroimidazole is mixed thoroughly with 24.4 g. (0.1 mole) of β-ethoxyethyl tosylate and heated to between 185–195° C. for 30 minutes. The mixture is cooled and shaken with a mixture of chloroform and 2.5 N aqueous sodium hydroxide. The chloroform layer is set aside while the aqueous layer is extracted with chloroform. The combined chloroform extracts are washed with water, dried over sodium sulfate and the solvent removed under reduced pressure. The residue is dissolved in ether and washed through a column of alumina using ether as the eluant. Evaporation of the eluate yields 1-ethoxyethyl-5-nitroimidazole.

$\lambda_{max.}^{MeOH}$
310.0 mμ.

In accordance with the above procedure but starting with methoxyethyl tosylate, propoxyethyl tosylate, butoxyethyl tosylate and benzyloxyethyl tosylate in place of ethoxyethyl tosylate, there is obtained the corresponding 1-methoxyethyl-5-nitroimidazole, 1 - propoxyethyl-5-nitroimidazole, 1-butoxyethyl-5-nitroimidazole and 1-benzyloxyethyl-5-nitroimidazole.

Preparation 11.—1-ethoxypropyl-5-nitroimidazole 11.3 g., (0.1 mole) of 5-nitroimidazole is mixed thoroughly with 25.8 g. (0.1 mole) of β-ethoxypropyl tosylate and heated to between 185-195° C. for 30 minutes. The mixture is cooled and dissolved in a mixture of chloroform and 2.5 N aqueous sodium hydroxide. The chloroform layer is set aside, and the aqueous layer extracted with chloroform. The combined chloroform extracts are washed with water, dried over sodium sulfate and the solvent removed under reduced pressure. The residue is dissolved in ether and washed through a column of alumina using ether as the eluant. Evaporation of the eluate yields 1-ethoxypropyl-5-nitroimidazole.

In accordance with the above procedure but starting with ethoxybutyl tosylate or ethoxypentyl tosylate in place of ethoxypropyl tosylate, there is obtained the corresponding 1-ethoxybutyl-5-nitroimidazole and 1-ethoxypentyl-5-nitroimidazole.

Preparation 12.—5-nitroimidazol-1-ylacetic acid 1.5 g., (.01 mole) of 1-(2'-hydroxyethyl)-5-nitroimidazole is taken up in 15 ml. of water and treated with 5.2 ml. of a chromic acid/sulfuric acid mixture (composition 27 g. of chromium trioxide, 2.35 ml. of concentrated sulfuric acid made up to 100 ml. with water). The reaction mixture is heated to 70° C. for one hour and allowed to stand for 18 hours. The mixture is diluted with 200 ml. of water and extracted with chloroform. The solvent is removed under reduced pressure and the residue taken up in sodium hydroxide which is extracted with ether. The ether layer is discarded. The sodium hydroxide extract is acidified with acetic acid, extracted with chloroform and the chloroform extract evaporated under reduced pressure to yield 5-nitroimidazol-1-ylacetic acid; M.P. 225–230° C.

Preparation 13.—5-nitroimidazole-1-ylacetic acid 15.7 g., (0.1 mole) of 1-(2'-hydroxyethyl)-5-nitroimidazole is dissolved in 500 ml. of dimethylsulfoxide and heated with 8 ml. of dry pyridine and 4 ml. of trifluoroacetic acid and 61.8 g. (0.3 mole) of dicyclohexylcarbodiimide for 2 hours at 15–20° C. The mixture is treated with excess oxalic acid, filtered and the filtrate evaporated to dryness at a temperature of 80–90° C. under vacuum of less than 1 mm. of mercury pressure. The mixture is taken up in water, neutralized with aqueous sodium hydroxide to pH 8–9 and extracted thoroughly with ethyl acetate. After drying over sodium sulfate, the ethyl acetate extract is treated with dry gaseous hydrogen chloride and 5-nitroimidazole-1-ylacetaldehyde hydrochloride is removed by filtration. 1.55 g., (0.01 mole) of the aldehyde hydrochloride is dissolved in 30 ml. of water and 4 ml. of 2.5 N aqueous sodium hydroxide added. 0.011 mole of sodium hydrochlorite is added and the mixture allowed to stand at room temperature for 18 hours. The reaction mixture is then made acid with acetic acid and extracted with chloroform. The chloroform extract, after drying over sodium sulfate, is evaporated under reduced pressure to yield 5-nitroimidazol-1-ylacetic acid; M.P. 225–230° C.

In accordance with the above procedure but starting with 1-(3'-hydroxypropyl)-5-nitroimidazole in place of 1-(2'-hydroxyethyl)-5-nitroimidazole, there is obtained the corresponding 5-nitroimidazol-1-ylpropionic acid.

Preparation 14.—ethyl 5-nitroimidazol-1-ylacetate 22.6 g., (0.2 mole) of 5-nitroimidazole is dissolved in 250 ml. of nitromethane and 26 ml. (0.2 mole) of boron trifluoride etherate is added. The mixture is cooled to 0° C. and a solution of 25 ml. of diazoacetic ester in 25 ml. of nitromethane is added. An additional 12 ml. of diazoacetic acid is then added and the solution concentrated under reduced pressure. The residue is taken up in ethyl acetate and the ethyl acetate solution washed with ice cold aqueous dilute ammonia. A precipitate of 5-nitroimidazole is formed and is separated by filtration. The filtrate is thoroughly washed with water. After drying the ethyl acetate phase over sodium sulfate, dry hydrogen chloride gas is passed through the solution. Ethyl 5-nitroimidazol-1-yl-acetate hydrochloride; M.P. 165–175° C., is obtained as a crystalline precipitate.

The ester hydrochloride is dissolved in water from which ethyl 5-nitroimidazol-1-ylacetate; M.P. 76–77° C., crystallizes.

In accordance with the above procedure, but starting with methyl diazoacetate, propyl diazoacetate or benzyl diazoacetate in place of diazoacetic ester there is obtained the corresponding methyl, propyl and benzyl 5-nitroimidazol-1-ylacetates.

Preparation 15.—ethyl 5-nitroimidazol-1-ylpropionate 22.6 g., (0.2 mole) of 5-nitroimidazole is dissolved in 250 ml. of nitromethane and 26 ml. (0.2 mole) of boron trifluoride etherate is added. The mixture is cooled to 0° C. and a solution of 25 ml. of diazopropionic ester in 25 ml. of nitromethane is added. An additional 12 ml. of diazopropionic acid is then added and the solution concentrated under reduced pressure. The residue is taken up in ethyl acetate and the ethyl acetate solution washed with ice cold aqueous dilute ammonia. A precipitate of 5-nitroimidazole is formed and is separated by filtration. The filtrate is thoroughly washed with water. After drying the ethyl acetate phase over sodium sulfate, dry hydrogen chloride gas is passed through the solution. Ethyl 5-nitroimidazol-1-ylpropionate hydrochloride is obtained as a crystalline precipitate.

The ester hydrochloride is dissolved in water from which ethyl 5-nitroimidazol-1-ylpropionate crystallizes.

In accordance with the above procedure, but starting with methyl diazopropionate, propyl diazopropionate or benzyl diazopropionate in place of diazopropionic ester there is obtained the corresponding methyl-5-nitroimidazol-1-ylpropionate, propyl - 5 - nitroimidazol-1-ylpropionate, and benzyl-5-nitroimidazol-1-ylpropionate.

Preparation 16.—5-nitroimidazol-1-ylacetic acid 10 g., (.05 mole) of ethyl-5-nitroimidazol-1-ylacetate dissolved in 50 ml. of methanol is treated with 50 ml. of 1 N potassium hydroxide (.05 mole) in 50 ml. of methanol. After ten minutes the solution is diluted with ether (50 ml.) which causes the potassium salt to crystallize. It is filtered, washed with 50% methanol-ether and dried.

This potassium salt is dissolved in 40 ml. of water and acidified slowly with concentrated hydrochloric acid to pH 2 or lower. The crystalline acid is filtered off, washed with water and dried; M.P. 226–228° C.

U.V. $\lambda_{max.}^{CH_3OH}$ 297.5 m$\mu$, 226.0 m$\mu$; $E_{1\,ml.}^{1\%}$ 458, 199

$\lambda_{max.}^{CH_3OH/HCl}$ 266.0 m$\mu$; $E_{1\,ml.}^{1\%}$ 335

Preparation 17.—Ethyl 5-nitroimidazol-1-ylacetate 17.1 g., (0.1 mole) of 5-nitroimidazol-1-ylacetic acid is taken up in 200 ml. of ethanol and heated under reflux for 5 hours, during which time a slow stream of dry hydrogen chloride is passed through the reaction mixture. The ethanol is then removed by evaporation under reduced pressure and the residue recrystallized from acetone to yield ethyl 5-nitroimidazole-1-ylacetate hydrochloride; M.P. 165–175° C.

The ester hydrochloride is dissolved in water. On standing for 10 minutes, ethyl-5-nitroimidazol-1-ylacetate; M.P. 76–77° C., is precipitated in crystalline form and is isolated by filtration.

In accordance with the above procedure, but using methanol, propanol or butanol in place of ethanol, there is obtained the corresponding methyl, propyl or butyl ester.

In accordance with the above procedure but starting with 5-nitroimidazol-1-ylpropionic acid in place of 5-5-nitroimidazol-1-ylacetic acid, there is obtained the corresponding ethyl, methyl, propyl and butyl 5-nitroimidazol-1-ylpropionates.

Preparation 18.—5-nitroimidazol-1-ylacetonitrile 3.4 g., (0.02 mole) of 5-nitroimidazol-1-ylacetamide in 50 ml. of dry benzene and 10 ml. of thionyl chloride are heated under reflux for 6 hours. The solvent and excess thionyl chloride are removed by evaporation under reduced pressure and the residue dissolved in chloroform. The chloroform is washed with dilute sodium carbonate solution and dried over sodium sulfate. Dry halogen chloride gas is introduced into the chloroform solution and 5-nitroimidazol-1-ylacetonitrile hydrochloride is isolated as a crystalline precipitate.

The 5-nitroimidazol-1-ylacetonitrile hydrochloride is treated with sodium bicarbonate solution. The mixture is extracted with ethyl acetate and the ethyl acetate removed under reduced pressure to yield 5-nitroimidazol-1-ylacetonitrile.

In accordance with the above procedure, but starting with 5-nitroimidazol-1-ylpropionamide in place of 5-nitroimidazol-1-ylacetamide, there is obtained the corresponding 5-nitroimidazol-1-ylpropionitrile.

Preparation 19.—1-(2′-ethylthioethyl)-5-nitroimidazole

A mixture of 3.11 g. (0.01 mole) of 5-nitroimidazol-1-ylethyl p-toluenesulfonate and 1.03 g. (0.012 mole) of the potassium salt of ethanethiol in 20 ml. of dry dimethylformamide is heated at about 100° C. overnight. The reaction mixture is cooled and is poured into 500 ml. of ice water containing a slight excess of ammonia. The mixture is extracted with ethyl acetate. The extract is dried and concentrated leaving a residue of 1-(2′-ethylthioethyl)-5-nitroimidazole.

In accordance with the above procedure but starting with 5-nitroimidazol-1-ylpropyl tosylate and 5-nitroimidazol-1-ylbutyl tosylate in place of ethyl tosylate, there is obtained the corresponding 1-(3′-ethylthiopropyl)-5-nitroimidazole, 1-(4′-ethylthiobutyl-5-nitroimidazole.

In accordance with the above procedure, but using the potassium salt of methanethiol, propanethiol, thiophenol and benzyl mercaptan in place of ethanethiol, there is obtained the corresponding 1-(2′-methylthioethyl-5-nitroimidazole, 1-(2′-propylthioethyl-5-nitroimidazole, 1-(2′-phenylthioethyl)-5-nitroimidazole and 1 - (2′-benzylthioethyl)-5-nitroimidazole.

Preparation 20.—1-(2′-ethylsulfinylethyl)-5-nitroimidazole

A solution of 1.0 g. (0.005 mole) of 1-(2′-ethylthioethyl)-5-nitroimidazole is cooled to about −20 to −30° C. and a cold solution of 55 ml. (0.0055 mole) of 0.1 N mono-perphthalic acid in 1,2-dimethoxyethane is added. The mixture is kept overnight in the cold room. The mixture is concentrated to dryness at reduced pressure leaving a residue which, after neutralization with dilute ammonia, is extracted several times with chloroform. Evaporation of the chloroform extract leaves a residue of 1-(2′-ethylsulfinylethyl)-5-nitroimidazole.

In accordance with the above procedure, but starting with 1-(2′-ethylthiopropyl)-5-nitroimidazole, 1-(2′-ethylthiobutyl)-5-nitroimidazole, 1 - (2′-methylthioethyl)-5-nitroimidazole, 1-(2′-propylthioethyl)-5-nitroimidazole, 1-(2′ - phenylthioethyl)-5-nitroimidazole and 1-(2′-benzylthioethyl)-5-nitroimidazole, in place of 1-(2′-ethylthioethyl)-5-nitroimidazole, there is obtained the corresponding 1-(2′-ethylsulfinylpropyl)-5-nitroimidazole, 1 - (2′-ethylsulfinylbutyl)-5-nitroimidazole, 1-(2′-methylsulfinylethyl)-5-nitroimidazole, 1-(2′ - propylsulfinylethyl)-5-nitroimidazole, 1-(2′-phenylsulfinylethyl)-5-nitroimidazole, and 1-(2′-benzylsulfinylethyl)-5-nitroimidazole.

Preparation 21.—5-nitroimidazol-1-ylethylethylsulfone

A mixture of 438 mg. (0.02 mole) of 1-(2′-ethylsulfinylethyl)-5-nitroimidazole, 2 ml. of glacial acetic acid and 2 ml. of 30% hydrogen peroxide is heated for 8 hours at 100° C. The solution is concentrated under reduced pressure (but not to dryness), water is added to the residue. 5-nitroimidazol-1-ylethylethylsulfone which precipitates is separated by filtration, washed with water and air dried.

In accordance with the above procedure but starting with 1-(2′ - methylsulfinylethyl)-5-nitroimidazole, 1-(2′-propylsulfinylethyl)-5-nitroimidazole, 1-(2′-butylsulfinylethyl)-5-nitroimidazole, 1-(2′ - methylsulfinylethyl)-5-nitroimidazole, 1-(2′-ethylsulfinylpropyl)-5-nitroimidazole, 1-(2′-phenylsulfinylethyl) - 5 - nitroimidazole, and 1-(2′-benzylsulfinylethyl)-5-nitroimidazole, in place of 1-(2′-ethylsulfinylethyl)-5-nitroimidazole, there is obtained the corresponding 5-nitroimidazol-1-ylmethylethylsulfone, 5-nitroimidazol-1-ylpropylethylsulfone, 5 - nitroimidazol-1-ylbutylethylsulfone, 5 - nitroimidazol-1-ylethylmethylsulfone, 5-nitroimidazol - 1 - ylethylpropylsulfone, 5-nitroimidazol-1-ylethylphenylsulfone, and 5-nitroimidazol-1-ylethylbenzylsulfone.

Preparation 22.—1-(2′-p-toluenesulfonyloxyethyl-5-nitroimidazole 20 g., (0.127 mole) of 1-(2′-hydroxyethyl)-5-nitroimidazole in 50 ml. of dry pyridine is reacted with 75 g. of p-toluene sulfonyl chloride at 15° C. for 4 hours. The reaction mixture is poured into ice and water and the crystalline precipitate is separated by filtration, washed with water and air dried to yield 1-(2′-p-toluenesulfonyloxyethyl)-5-nitroimidazole; M.P. 126–127° C.

In accordance with the above procedure, but starting with 1-(2′-hydroxy propyl)-5-nitroimidazole, 1-(2′-hydroxy butyl)-5-nitroimidazole, 1-(2′-hydroxy pentyl)-5-nitroimidazole, 1-(3′-hydroxy propyl)-5-nitroimidazole, 1-(3′-hydroxy butyl)-5-nitroimidazole, and 1-(3′-hydroxy pentyl)-5-nitroimidazole, in place of 1-(2′-hydroxy ethyl)-5-nitroimidazole, there is obtained the corresponding 1-(2'-p-toluenesulfonyloxypropyl)-5-nitroimidazole, 1-(2'-p-toluenesulfonyloxybutyl)-5-nitroimidazole, 1-(2'-p-toluenesulfonyloxypentyl)-5-nitroimidazole, 1 - (3'-p-toluenesulfonyloxypropyl)-5-nitroimidazole, 1-(3'-p-toluenesulfonyloxybutyl)-5-nitroimidazole, and 1-(3'-p-toluenesulfonyloxypentyl)-5-nitroimidazole.

Preparation 23.—1-(2'-N-morpholinylethyl)-5-nitroimidazole 16 g., (.057 mole) of 1-(2'-p-toluenesulfonyloxyethyl)-5-nitroimidazole and 9.3 ml. of morpholine are heated at 95° C. for 4 hours. The reaction mixture is taken up in water and extracted with ether. Evaporation of the ether yields 1-(2'-N-morpholinylethyl)-5-nitroimidazole; M.P. 109–110° C.

In accordance with the above procedure, but starting with pyrrolidine piperidine, dimethylamine, and diethylamine, in place of morpholine, there is obtained the corresponding 1-(2' - N-pyrrolidinylethyl)-5-nitroimidazole, 1-(2'-N-piperidinylethyl)-5-nitroimidazole, 1-(2'-NN-dimethylaminoethyl)-5-nitroimidazole, and 1-(2'-NN-diethylaminoethyl)-5-nitroimidazole.

Preparation 24.—1-methyl-2-hydroxymethyl-5-nitroimidazole 27.9 g. of 1-methyl-5-nitroimidazole and 30.1 g. of paraformaldehyde are added to 154 ml. of dimethylsulfoxide and the resulting solution is sealed into a glass-lined tube. The solution is heated at 110° C. for 24 hours, with shaking. The dimethylsulfoxide is removed by distillation at 53–56° C./2 mm. The residue is extracted with 3× 150 ml. of hot benzene. The benzene extracts are combined and cooled to room temperature. 1-methyl-2-hydroxymethyl - 5 - nitroimidazole crystallizes, and is recovered by filtration. The yield of product is 23 g.; M.P. 112–114.5° C.

Preparation 25.—1 - [2' - (tetrahydropyran - 2'' - yloxy)-ethyl]-2-hydroxymethyl-5-nitroimidazole 15.7 g., (0.1 mole) of 1-(2'-hydroxyethyl)-5-nitroimidazole is heated under reflux in 200 ml. of dihydropyran in the presence of 1 g. of p-toluene sulfonic acid for 12 hours. The solvent is removed by evaporation under reduced pressure. The residue is taken up in a mixture of chloroform and aqueous sodium bicarbonate. The chloroform phase after drying over sodium sulfate, is evaporated. The residue is dissolved in 75 ml. of dimethylsulfoxide containing 15 g. of paraformaldehyde, and the resulting solution is sealed into a glass-lined tube. The solution is heated at 110° C. for 24 hours, with shaking. The mass is then removed from the reaction vessel and the dimethylsulfoxide removed by distillation at 53–56° C./2 mm. The residue is extracted with 3× 150 ml. of hot benzene. The benzene extracts are combined and concentrated to a small volume. 1-(2-hydroxymethyl-5-nitroimidazol-1-yl) ethyl tetrahydropyranyl ether crystallizes and is recovered by filtration.

Preparation 26.—1-methyl-2-formyl-5-nitroimidazole 100 gm. (0.64 mole) of 1-methyl-2-hydroxymethyl-5-nitroimidazole is dissolved in 3500 ml. of benzene at 70° C. There is added over a 20 minute period 460 gm. of lead tetraacetate (previously washed with glacial acetic acid and air dried in the dark). The reaction mixture is stirred at 78° C. for 8 hours during which time white, crystalline lead diacetate precipitates from the solution. The mixture is allowed to stand overnight at room temperature, and the lead diacetate then removed by filtration and washed with 2× 100 ml. of benzene. The combined benzene filtrate and washes are extracted with two 1 liter portions of saturated aqueous potassium bicarbonate, then with 1500 ml. of water. The aqueous extracts are combined and extracted with 3× 2500 ml. portions of chloroform. The chloroform extracts are backwashed individually with 500 ml. of water and then combined with the benzene solution and evaporated in vacuo to dryness. The residue is dissolved in 500 ml. of 10% sulfuric acid and warmed on the steam cone at 75–90° C. for 35 minutes.

The acidic solution is then cooled to room temperature and neutralized with sodium bicarbonate. This aqueous solution is then extracted with 4× 2500 ml. portions of chloroform and each extract is backwashed in turn with 500 ml. of water. The organic extracts are combined and evaporated to dryness, in vacuo. The crystalline residue thus obtained is dissolved in a minimum volume of chloroform and filtered over about 250 gm. of silica gel. The silica gel is eluted with 7500 ml. of methylene dichloride. The eluate is evaporated in vacuo to give a residue of substantially pure 1-methyl-2-formyl-5-nitroimidazole. Recrystallization of the product from 500 ml. of boiling hexane affords 79 gm. of 1-methyl-2-formyl-5-nitroimidazole; M.P. 90–94° C.

Preparation 27.—1-methyl-2-(1'-hydroxyethyl)-5-nitroimidazole

A solution of methyl magnesium iodide is prepared from 4.5 gm. of magnesium, 26.3 gm. of methyl iodide and 90 ml. of diethyl ether. 2.8 mg. of this solution is diluted with 15 ml. of ether, and added to a solution of 0.5 gm. of 1-methyl-2-formyl-5-nitroimidazole in 20 ml. of diethyl ether. The mixture is refluxed for 20 minutes. An additional 15 ml. of diethyl ether is then added, followed by 6.7 ml. of 0.5 N hydrochloric acid. The organic phase is separated, dried over sodium sulfate and evaporated to dryness in vacuo to give 0.27 g. of 1-methyl-2-(1'-hydroxyethyl)-5-nitroimidazole. This material is dissolved in ether, an equal volume of petroleum ether added, and the resulting solution evaporated to give crystalline 1-methyl-2-(1'-hydroxyethyl)-5-nitroimidazole.

The acidic aqueous layer is extracted with an equal volume of methylene chloride. The methylene chloride solution is evaporated to a residue which is dissolved in a minimum volume of methylene chloride. One-half volume of petroleum ether is added and the solution evaporated to give a residue of 1-methyl-2-(1'-hydroxyethyl)-5-nitroimidazole.

The solid products obtained are combined and dissolved in ethyl acetate. The solution is filtered through acid-washed alumina, and the filtrate evaporated to a small volume. 1 - methyl-2-(1'-hydroxyethyl)-5-nitroimidazole crystallizes; M.P. 144–145° C. It is recrystallized from ethyl acetate to give pure 1-methyl-2-(1'-hydroxyethyl)-5-nitroimidazole; M.P. 145–147° C.

Preparation 28.—1-methyl-2-(1'-hydroxyethyl)-5-nitroimidazole

To a solution of 1.5 g., (.01 mole) of 1-methyl-5-nitroimidazole - 2 - carboxaldehyde in 15 ml. of 1,2-dimethoxymethane at 0° C. containing 1.33 ml. of boron trifluoride etherate is added 0.9 g. of diazomethane in 50 ml. of diethyl ether solution dropwise over about 20 minutes. Nitrogen gas is evolved. After stirring for one hour at 0° C., the solution is allowed to warm gradually to room temperature. The solvent is evaporated. Chloroform (100 ml.) and 20 ml. of water (containing 5 ml. of 4 N ammonium hydroxide) are added to the residue. The chloroform layer is separated, washed with 10 ml. of water, dried over anhydrous sodium sulfate and evaporated. The residue is chromatographed on silica gel to give 1 - methyl - 2 - acetyl - 5 - nitroimidazole; M.P. 98° C.

To 1.83 g., (0.01 mole) of 1 - methyl - 2 - acetyl-5-nitroimidazole dissolved in 50 ml. of ethanol is added 0.38 g. of sodium borohydride. The solution is allowed to stand overnight at room temperature. Following the addition of a few drops of glacial acetic acid to destroy unreacted sodium borohydride, 20 ml. of water is added and the solution evaporated to about 20 ml. 1-methyl-2-

(1'-hydroxyethyl)-5-nitroimidazole is separated by filtration, washed with water and air dried.

In accordance with the above procedure but using diazoethane, diazopropane or phenyldiazomethane in place of diazomethane, there is obtained the corresponding 1 - methyl - 2 - (1' - hydroxypropyl) - 5 - nitroimidazole, 1 -methyl - 2 - (1' - hydroxybutyl) - 5-nitroimidazole, and 1 - methyl - 2 - (1' - hydroxyphenethyl)-5-nitroimidazole.

Preparation 29.—α-(1-methyl-5-nitroimidazol-2-yl) benzyl alcohol 6 g. of 2 - benzylimidazole is added to 17 ml. of concentrated nitric acid in 75 ml. of acetic anhydride and cooled in an ice bath. The reaction mixture is warmed on a steam bath for 30 minutes, and then poured into crushed ice. The crude product is extracted with 3× 100 ml. of chloroform. The combined chloroform extract is washed with 3× 15 ml. water, dried over anhydrous sodium sulfate and evaporated to dryness. The residue is dissolved in 50 ml. acetone. The addition of diethyl ether to the cloud-point results in the crystallization of 2-benzyl-4(5)-nitroimidazole.

2.03 g. of 2-benzyl-4(5)-nitroimidazole and 1.3 g. of dimethyl sulfate are heated for 30 minutes at 120° C. After cooling, 100 ml. of chloroform and 10 ml. of 4 N sodium hydroxide solution are added. The chloroform extract after washing with 3× 10 ml. of water is dried over anhydrous sodium sulfate and evaporated. The crude 1-methyl - 2 - benzyl - 5 - nitroimidazole is purified by recrystallization from ethanol.

3.22 g. of 1 - methyl - 2 - benzyl - 5 - nitroimidazole is dissolved in a mixture of 45 ml. of water and 15 ml. of sulfuric acid.

5.25 g. of sodium dichromate dihydrate in 30 ml. of water is added. 75 ml. of sulfuric acid is added so as to maintain the temperature between 75 and 90° C. Heating is continued for one hour at about 70° C. The reaction mixture is poured onto crushed ice and concentrated sodium hydroxide is added to neutrality. The product, 1 - methyl - 2 - benzoyl - 5 - nitroimidazole, is filtered.

To 2.15 g. of 1 - methyl - 2 - benzoyl - 5 - nitroimidazole in 100 ml. of ethanol is added 0.28 g. of sodium borohydride. The mixture is allowed to stand overnight. After the addition of a few drops of glacial acetic acid, 25 ml. of water is added and the ethanol evaporated. The product, α - (1 - methyl - 5 - nitroimidazol - 2 - yl) benzyl alcohol is removed by filtration.

Preparation 30.—2-(1-methyl-5-nitroimidazol-2-yl)-ethanol

A mixture of 70 g. (0.5 mole) of 1,2-dimethyl-5-nitroimidazole, 75 g. (2.5 mole) of paraformaldehyde, and 1 liter of dry dimethylsulfoxide is heated in a glass-lined, rocking autoclave at 120–150° C. overnight. The bulk of the dimethylsulfoxide is removed at reduced pressure. The residue is dissolved in 400 ml. of 2.5 N hydrochloric acid, and the solution is exhaustively extracted with chloroform to remove the rest of the dimethylsulfoxide. The aqueous phase is adjusted to pH 7.5 by the addition of 50% sodium hydroxide solution, and is again extracted exhaustively with chloroform. The extract is dried and concentrated leaving an oily residue which soon crystallizes. The solid is dissolved in a little ethyl acetate, and the solution is charged to a column of alumina. Elution with ethyl acetate and evaporation of the solvent yields 2 - (1 - methyl - 5 - nitroimidazol-2-yl)ethanol; M.P. 149–151° C.

$\lambda_{max.}^{MeOH}$ 310 m$\mu$, ($\epsilon$, 8800); 2 - (1 - methyl - 5 - nitroimidazol-2-yl)propan-1,3-diol; M.P. 123–125° C.;

$\lambda_{max.}^{MeOH}$ 310 m$\mu$, ($\epsilon$, 9000); and 2 - (1 - methyl-5-nitroimidazol-2-yl)prop-2-en-1-ol; M.P. 140–142° C.;

$\lambda_{max.}^{MeOH}$ 221 m$\mu$, ($\epsilon$, 9900), 315 m$\mu$, ($\epsilon$, 9700).

Preparation 31.—3-(1-methyl-5-nitroimidazol-2-yl) prop-2-en-1-olal

A mixture of 0.155 g., (0.001 mole) 1-methyl-2-formyl-5-nitroimidazole, 0.304 g. (0.001 mole) of formylmethyltriphenylphosphorane in 6 ml. of benzene is heated under reflux for 18 hours. The solvent is removed under pressure to give a crystalline residue which is dissolved in 75 ml. of ether. The solution is washed with 1 N aqueous hydrochloric acid. The hydrochloric acid fraction is made basic by the addition of excess potassium bicarbonate and the resulting aqueous solution extracted with ether. The ether extract is dried and the solvent removed. The residue is taken up in warm benzene and chromatographed on silica gel. Elution with ether followed by recrystallization from ethanol yields 3 - (1-methyl - 5 - nitroimidazol - 2 - yl) - prop - 2 - en - 1-al; M.P. 147–149° C.

Preparation 32.—3-(1-methyl-5-nitroimidazol-2-yl) prop-2-en-1-ol 8.29 g., (0.046 mole) 3 - ( 1 - methyl - nitroimidazol - 2 - yl)prop - 2 - en - 1 - al is taken up in 2.2 liters of ethanol and 0.97 g., (.026 mole) of sodium borohydride in 20 ml. of water is added and the mixture allowed to stand for 5 hours. The reaction mixture is then made neutral to pH paper by the addition of 7 ml. of glacial acetic acid, and concentrated under reduced pressure to 35 ml. The solids are separated by filtration. The product is recrystallized from butanol to yield 3 - (1 - methyl-5 - nitroimidazol - 2-yl)prop-2-en-1-ol; M.P. 132–134° C.

Preparation 33.—3-(1-methyl-5-nitroimidazol-2-yl)propanol

A mixture of 200 mg. (0.001 mole) of 3-(1-methyl-5-nitroimidazol-2-yl)-prop-2-en-1-ol and 430 mg. (0.0022 mole) of potassium azodicarboxylate in 15 ml. of methanol is stirred under nitrogen at 15° C. Glacial acetic acid (0.264 ml., 0.0044 mole) is added and the resulting solution is stirred overnight. The solvent is removed at reduced pressure. The residue is dissolved in 5 ml. of water and the solution is extracted continuously with chloroform for 1–2 hours. The extract is dried and concentrated leaving a residue. The residue crystallizes on addition of water to yield 3-(1-methyl-5-nitroimidazol-2-yl)propanol; M.P. 170–175° C.

Preparation 34.—1-methyl-2-chloromethyl-5-nitroimidazole 1.0 gm. (0.0064 mole) of 1-methyl-2-hydroxymethyl-5-nitroimidazole is dissolved in 100 ml. of refluxing benzene. To this hot solution is added 20 ml. of thionyl chloride. The solution is warmed on a steam cone for 20 minutes and then evaporated to dryness in vacuo. The residue of 1 - methyl - 2 - chloromethyl - 5 - nitroimidazole hydrochloride thus obtained is flushed several times with benzene to remove traces of thionyl chloride. (The 1-methyl - 2 - chloromethyl - 5 - nitroimidazole hydrochloride prepared in this manner is suitable for synthetic purposes without further purification). It is further purified as follows: It is dissolved in 25 ml. of water and the solution made slightly alkaline (pH 8–9) with dilute sodium hydroxide and extracted with 3× 100 ml. of chloroform. The chloroform extracts are combined, backwashed with water and evaporated in vacuo to dryness to give substantially pure 1-methyl-2-chloromethyl-5-nitroimidazole.

The 1 - methyl - 2 - chloromethyl - 5 - nitroimidazole is characterized as the p-toluene sulfonic acid salt: To a 20% (w./w.) solution of the imidazole in chloroform there is added a solution of excess p-toluene sulfonic acid in ether. The 1-methyl-2-chloromethyl-5-nitroimidazole p-toluene sulfonic acid salt precipitates and is recovered by filtration and dried to substantially pure material; M.P. 153–155° C.

In accordance with the above procedure, but using thionyl bromide in place of thionyl chloride, there is obtained the corresponding 1-methyl-2-bromomethyl-5-nitroimidazole.

Preparation 35.—1-methyl-2-p-toluenesulfonyloxymethyl-5-nitroimidazole

To a solution of 1.57 g. (0.01 mole) of 1-methyl-2-hydroxymethyl-5-nitroimidazole in 10 ml. of dry pyridine, cooled to −20° C., is added 1.90 g. (0.01 mole) of p-toluenesulfonyl chloride. The mixture is kept at −20° C. overnight. After the addition of 20 ml. of ice-water, the solid product is removed by filtration.

In accordance with the above procedure, but starting with methane sulfonyl chloride in place of p-toluene sulfonyl chloride, there is obtained the corresponding 1-methyl-2-methanesulfonyloxymethyl-5-nitroimidazole.

Preparation 36.—1-methyl-2-mercaptomethyl-5-nitroimidazole 250 mg. of 1-methyl-2-chloromethyl-5-nitroimidazole and 106 mg. of thiourea are added to 2 ml. of dry ethanol, and the resulting mixture refluxed for 17 hours. At the end of this time the mixture is cooled to about 15° C. and the solid material removed by filtration.

1.26 g. of 1-methyl-5-nitroimidazol-2-yl-methyl isothiouronium chloride is added to 20 ml. of water and 2 ml. of 2.5 N sodium hydroxide in a nitrogen atmosphere. The mixture is heated at 55° C. for 15 minutes. At the end of this time the mixture is cooled to room temperature and extracted with three 10 ml. portions of chloroform. The chloroform extracts are combined and concentrated to dryness to give 1-methyl-2-mercaptomethyl-5-nitroimidazole suitable for use in making carbamates.

Preparation 37.—1-methyl-5-nitroimidazol-2-ylmethyl phenyl carbonate 15.9 ml. dry pyridine and 4.87 g. (0.031 mole) of 1-methyl-2-hydroxymethyl-5-nitroimidazole are added to a flask fitted with a stirrer, thermometer and addition funnel. The mixture is stirred at room temperature until the solid dissolves and then cooled to 0° C. 5.05 g. (0.0322 mole) of phenylchloroformate is added to the stirred solution over an 80 minute period, while maintaining the temperature at 5–10° C. with external cooling. On completion of the addition the reaction mixture is stirred at about 25° C. for 2½ hours. It is then poured into 60 ml. of ice-water with good agitation. The resulting slurry is stirred for 40 minutes and the resulting solid 1-methyl-5-nitroimidazol-2-ylmethyl phenyl carbonate collected by filtration. The solid is washed thoroughly with water and dried in vacuo at 50° C. A yield of 8.24 g. is obtained; M.P. 92–95° C. Recrystallization from 1:3 methanol-hexane gives pure product; M.P. 100–100.5° C.

In accordance with the above procedure, but starting with 1 - methyl - 2-mercaptomethyl-5-nitroimidazole, in place of 1-methyl-2-hydroxymethyl-5-nitroimidazole, there is obtained the corresponding 1-methyl-5-nitroimidazol-2-yl-methyl phenyl thiocarbonate.

In accordance with the above procedure, but starting with 1 - methyl-2-(1-hydroxyethyl)-5-nitroimidazole, 1-methyl - 2-(2-hydroxyethyl)-5-nitroimidazole and 3-(1-methyl-5-nitroimidazol-2-yl)prop-2-en-1-ol in place of 1-methyl - 2-hydroxymethyl-5-nitroimidazole, there is obtained the corresponding 1 - (1-methyl-5-nitroimidazol-2-yl)-ethylphenyl carbonate, 2-(1-methyl-5-nitroimidazol-2-yl)-ethylphenyl carbonate, and 3-(1-methyl-5-nitroimidazol-2-yl)-prop-2-en-1-yl phenyl carbonate.

Preparation 38.—1-methyl-5-nitroimidazol-2-ylmethyl-phenyl thionocarbonate 5.17 g. phenoxythiocarbonyl chloride is added dropwise to a cold solution of 4.71 g. of 1-methyl-2-hydroxymethyl-5-nitroimidazole in 15 ml. of pyridine. During addition the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice-water mixture. A gummy precipitate forms. The water is decanted from this precipitate and the solid triturated with 70 ml. of methanol. Water (70 ml.) is added and the solid product removed by filtration. It is recrystallized from benzene-hexane to give 1 - methyl-5-nitroimidazol-2-yl-methyl phenyl thionocarbonate; M.P. 92–98° C. On further recrystallization from benzene-hexane the product melts at 103–105.5° C.

In accordance with the above procedure, but starting with 1-methyl-2-mercaptomethyl-5-nitroimidazole in place of 1 - methyl-2-hydroxymethyl-5-nitroimidazole, there is obtained the corresponding 1-methyl-5-nitroimidazol-2-yl-methyl phenyl dithiocarbonate.

I claim:
1. A compound having the formula

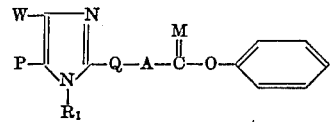

wherein $R_1$ is alkyl or substituted alkyl, wherein said substituent group is oxo, alkanoyloxy, phenylalkanoyloxy, alkoxy, phenylalkoxy, carboalkoxy, carbophenylalkoxy, alkylcarbamoyl, phenylalkylcarbamoyl, phenylcarbamoyl, carbamoyl, cyano, alkylthio, phenylalkylthio, phenylthio, alkylsulfinyl, phenylalkylsulfinyl, phenylsulfinyl, alkylsulfonyl, phenylalkylsulfonyl, phenylsufonyl, halo, phenyl or benzoyloxy;

Q is loweralkylene, loweralkylidene, loweralkenylene, or phenyloweralkylene;

A represents oxygen and, where Q represents methylene, sulfur;

M represents oxygen or sulfur;

W is nitro, or hydrogen, and P is hydrogen or nitro, provided that one and only one of the groups W and P is nitro;

wherein the alkyl, alkoxy, and alkanoyl substituents comprising $R_1$ are loweralkyl, loweralkoxy, and loweralkanoyl, respectively and are of 1 to 5 carbon atoms.

2. A compound of claim 1 having the designation 1-methyl-5-nitroimidazol-2-ylmethyl phenylcarbonate.

References Cited

UNITED STATES PATENTS

| | | | |
|---|---|---|---|
| Re. 24,505 | 7/1958 | Rimington et al. | 260—309 |
| 2,944,061 | 7/1960 | Jacob et al. | 260—309 |
| 3,104,256 | 9/1963 | Davis et al. | 260—482 |
| 3,224,862 | 12/1965 | Weiss. | |
| 3,252,986 | 5/1966 | Gadekar. | |

OTHER REFERENCES

Noller Chemistry of Organic Compounds, 2nd ed., page 170, Philadelphia, Saunders 1958, QO253.N65. Copy in Patent Office Scientific Library.

HENRY R. JILES, Primary Examiner

NATALIE TROUSOF, Assistant Examiner

U.S. Cl. X.R.

260—243, 247.1, 247.2, 268, 293.4, 294.3, 309.7, 999